US011551697B2

(12) United States Patent
Ramasamy et al.

(10) Patent No.: US 11,551,697 B2
(45) Date of Patent: *Jan. 10, 2023

(54) PROCESSING SYSTEM FOR INTELLIGENTLY LINKING MESSAGES USING MARKERS BASED ON LANGUAGE DATA

(71) Applicant: Bank of America Corporation, Charlotte, NC (US)

(72) Inventors: Suki Ramasamy, Chennai (IN); John Dinakar Iruvanti, Telegana (IN); Mahesh Ganesan, Chennai (IN)

(73) Assignee: Bank of America Corporation, Charlotte, NC (US)

(*) Notice: Subject to any disclaimer, the term of this patent is extended or adjusted under 35 U.S.C. 154(b) by 120 days.

This patent is subject to a terminal disclaimer.

(21) Appl. No.: 16/814,362

(22) Filed: Mar. 10, 2020

(65) Prior Publication Data
US 2020/0211564 A1 Jul. 2, 2020

Related U.S. Application Data

(63) Continuation of application No. 15/662,875, filed on Jul. 28, 2017, now Pat. No. 10,679,627.

(51) Int. Cl.
*H04L 12/58* (2006.01)
*H04L 12/18* (2006.01)
(Continued)

(52) U.S. Cl.
CPC ............. *G10L 15/30* (2013.01); *G06F 3/167* (2013.01); *G06F 16/24* (2019.01); *G06F 16/248* (2019.01); *G10L 2015/088* (2013.01)

(58) Field of Classification Search
CPC .. G06F 40/232; G06F 3/04886; G06F 40/242; G06F 3/016; G06F 3/04842;
(Continued)

(56) References Cited

U.S. PATENT DOCUMENTS 5,872,521 A 2/1999 Lopatukin et al.
6,393,460 B1 5/2002 Gruen et al.
(Continued)

OTHER PUBLICATIONS

Frank Perbet et al. "Random Forest Clustering and Application to Video Segmentation" Toshiba Research Europe Cambridge Research Laboratory, http://www.toshiba-europe.com/research/crl/cvg/ Copyright 2009.

(Continued)

*Primary Examiner* — Olujimi A Adesanya
(74) *Attorney, Agent, or Firm* — Banner & Witcoff, Ltd.

(57) ABSTRACT

Some aspects disclosed herein are directed to, for example, a system and method comprising a client device receiving an input of at least a portion of a message. The client device may display, on a display of the client device, the at least the portion of the message. The client device may transmit, to a server device, the at least the portion of the message for display via a second client device. The client device may receive, from a user of the client device or a user of the second client device, a request to generate a marker for the at least the portion of the message. In response to the receiving the request to generate the marker, the client device may determine, based on a lexicon, a name for the marker for the at least the portion of the message. The client device may store, at a storage location, the name for the marker for the at least the portion of the message, an identifier for the at least the portion of the message, and an association between the name for the marker for the at least the portion of the message and the identifier for the at least the portion of the message.

20 Claims, 11 Drawing Sheets

(51) Int. Cl.
*G10L 15/30* (2013.01)
*G06F 16/24* (2019.01)
*G06F 16/248* (2019.01)
*G06F 3/16* (2006.01)
*G10L 15/08* (2006.01)

(58) Field of Classification Search
CPC .. G06F 3/04883; G06F 3/0237; G06F 16/334; G06F 40/253; G06F 40/279; G06F 16/3322; G06F 16/90324; G06F 16/90344; G06F 40/284; G06F 40/30; G06F 16/3338; G06F 16/9535
See application file for complete search history.

(56) References Cited

U.S. PATENT DOCUMENTS

| | | | |
|---|---|---|---|
| 7,024,462 B1 | 4/2006 | McErlean | |
| 7,127,685 B2 | 10/2006 | Canfield et al. | |
| 7,194,536 B2 | 3/2007 | Fellenstein et al. | |
| 7,254,610 B1 | 8/2007 | Turner et al. | |
| 7,284,207 B2 | 10/2007 | Canfield et al. | |
| 7,292,870 B2 | 11/2007 | Heredia et al. | |
| 7,295,657 B1 | 11/2007 | Keohane et al. | |
| 7,298,831 B1 | 11/2007 | Keohane et al. | |
| 7,403,838 B2 | 7/2008 | Deen et al. | |
| 7,525,975 B2 | 4/2009 | Caspi et al. | |
| 7,590,696 B1 | 9/2009 | Odell et al. | |
| 7,596,596 B2 | 9/2009 | Chen et al. | |
| 7,779,076 B2 | 8/2010 | Heikes et al. | |
| 7,856,469 B2 | 12/2010 | Chen et al. | |
| 7,877,450 B2 | 1/2011 | Odell et al. | |
| 7,899,871 B1 * | 3/2011 | Kumar | G06Q 10/107 709/206 |
| 9,116,984 B2 | 8/2015 | Caldwell et al. | |
| 9,122,751 B2 | 9/2015 | Chen et al. | |
| 9,240,969 B1 * | 1/2016 | Jordan | H04L 51/32 |
| 9,306,878 B2 | 4/2016 | Patil | |
| 9,473,432 B2 | 10/2016 | Chung et al. | |
| 10,382,379 B1 * | 8/2019 | Zhang | G06F 16/24578 |
| 2003/0046273 A1 | 3/2003 | Deshpande | |
| 2003/0078979 A1 | 4/2003 | Sagi | |
| 2003/0130014 A1 | 7/2003 | Rucinski | |
| 2003/0208545 A1 | 11/2003 | Eaton et al. | |
| 2004/0029085 A1 | 2/2004 | Hu et al. | |
| 2004/0174863 A1 | 9/2004 | Caspi et al. | |
| 2004/0177376 A1 | 9/2004 | Caspi et al. | |
| 2004/0205775 A1 | 10/2004 | Heikes et al. | |
| 2005/0102362 A1 | 5/2005 | Price et al. | |
| 2005/0138128 A1 | 6/2005 | Baniel et al. | |
| 2005/0235034 A1 | 10/2005 | Chen et al. | |
| 2006/0143559 A1 | 6/2006 | Spielberg et al. | |
| 2007/0072564 A1 | 3/2007 | Adams | |
| 2007/0203985 A1 | 8/2007 | Abernethy et al. | |
| 2008/0075244 A1 * | 3/2008 | Hale | G10L 15/26 379/88.13 |
| 2008/0098125 A1 | 4/2008 | Wang Baldonado et al. | |
| 2008/0109406 A1 | 5/2008 | Krishnasamy et al. | |
| 2008/0275849 A1 | 11/2008 | Basu et al. | |
| 2008/0311935 A1 | 12/2008 | Tysowski | |
| 2009/0055481 A1 | 2/2009 | Carmel et al. | |
| 2009/0307613 A1 | 12/2009 | Essenmacher et al. | |
| 2009/0319617 A1 | 12/2009 | Bhakar et al. | |
| 2011/0202756 A1 * | 8/2011 | West | H04L 63/0428 713/152 |
| 2011/0231499 A1 | 9/2011 | Stovicek et al. | |
| 2011/0320542 A1 | 12/2011 | Bendel et al. | |
| 2012/0130771 A1 | 5/2012 | Kannan et al. | |
| 2012/0209871 A1 | 8/2012 | Lai et al. | |
| 2012/0272160 A1 | 10/2012 | Spivack et al. | |
| 2013/0007137 A1 | 1/2013 | Azzam et al. | |
| 2013/0198296 A1 * | 8/2013 | Roy | G06Q 10/107 709/206 |
| 2014/0067842 A1 | 3/2014 | Chen et al. | |
| 2014/0189532 A1 | 7/2014 | Sivaraman et al. | |
| 2015/0262238 A1 | 9/2015 | Aitchison et al. | |
| 2016/0344667 A1 | 11/2016 | Lane et al. | |
| 2017/0032021 A1 | 2/2017 | Watanachote | |
| 2017/0220580 A1 | 8/2017 | Chi et al. | |
| 2017/0324695 A1 * | 11/2017 | Fischer | H04L 51/224 |
| 2017/0337284 A1 * | 11/2017 | Garrett | G06F 16/9535 |
| 2018/0144188 A1 | 5/2018 | Evanitsky | |
| 2018/0239822 A1 * | 8/2018 | Reshef | G06F 40/242 |
| 2018/0316635 A1 * | 11/2018 | Chiu | H04L 67/306 |
| 2019/0005024 A1 | 1/2019 | Somech et al. | |
| 2019/0217848 A1 * | 7/2019 | Geller | B60W 30/1882 |

OTHER PUBLICATIONS

"Random Forest" Wikipedia, https://en.wikipedia.org/wiki/Random_forest pp. 1-7, site visited Jun. 22, 2017.
Sep. 21, 2018—U.S. Office Action—U.S. Appl. No. 15/662,865.
Sep. 25, 2018—U.S. Office Action—U.S. Appl. No. 15/662,875.

* cited by examiner

1100

| Tag identifier | Line # |
|---|---:|
| First Service | 2 |
| topic A | 47 |
| Second Service | 285 |
| topic B | 538 |

FIG. 11

PROCESSING SYSTEM FOR INTELLIGENTLY LINKING MESSAGES USING MARKERS BASED ON LANGUAGE DATA

CROSS REFERENCE TO RELATED APPLICATIONS

This application is a continuation of and claims priority to U.S. patent application Ser. No. 15/662,875 entitled "Processing System for Intelligently Linking Messages Using Markers Based on Language Data" and filed on Jul. 28, 2017, which is incorporated by reference in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used for a processing system using intelligent messaging flow markers based on language data.

BACKGROUND

Text from a messaging session between users may be displayed in a chat conversation window or browser. It may, however, be difficult to find specific content from the messaging session or to scroll up through lengthy messages or conversations. Currently, excessive data storage space may be used to store numerous lengthy messaging sessions between many different users. Moreover, existing processing resources may be overburdened when searching for specific content from current or previous messaging sessions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein are directed to, for example, a system and method comprising receiving, by a client device, an input of at least a portion of a message. The client device may transmit, to a server device, the at least the portion of the message for display via a second client device. The server device may receive, from the client device, the at least the portion of the message for display via the second client device. The server device may transmit, to the second client device, the at least the portion of the message for display via the second client device. A text conversation between the client device and the second client device and comprising the at least the portion of the message may be displayed on a display of the client device.

In some aspects, the client device may determine an identifier for the at least the portion of the message. The identifier for the at least the portion of the message may comprise a line number for the at least the portion of the message. In some aspects, the at least the portion of the message may comprise a plurality of occurrences of a word or phrase. Each occurrence of the word or phrase may be on a different line of a plurality of lines. Moreover, determining the identifier may comprise determining a line number for a line of the plurality of lines.

In some aspects, the client device may determine, based on a lexicon, a marker name for the at least the portion of the message. Determining the marker name for the at least the portion of the message may comprise comparing, by the client device, a word or phrase of the at least the portion of the message to a plurality of predefined topics in the lexicon and/or determining, by the client device, a match between the word or phrase of the at least the portion of the message and one or more of the plurality of predefined topics in the lexicon.

In some aspects, the client device may generate an association between the marker name for the at least the portion of the message and the identifier for the at least the portion of the message. The client device may store, at a storage location, the marker name for the at least the portion of the message, the identifier for the at least the portion of the message, and the association between the marker name for the at least the portion of the message and the identifier for the at least the portion of the message. The storage location may comprise an index, and the index may store the association between the marker name for the at least the portion of the message and the identifier for the at least the portion of the message.

In some aspects, the system and method described herein may comprise receiving, from a user of the client device, a request to display the at least the portion of the message. The request may comprise an indication of the marker name. The client device may determine, based on the indication of the marker name, and based on the association between the marker name for the at least the portion of the message and the identifier for the at least the portion of the message, the identifier for the at least the portion of the message. The method may comprise displaying, on a display of the client device and based on the identifier for the at least the portion of the message, the at least the portion of the message.

In some aspects, the marker name may comprise an implicit marker name. Determining the marker name for the at least the portion of the message may comprise determining the implicit marker name for the at least the portion of the message based on a natural language processing algorithm. In some aspects, receiving the input of the at least the portion of the message may comprise receiving, via a microphone of the client device, a voice input of the at least the portion of the message. The client device may convert the voice input of the at least the portion of the message into a text version of the at least the portion of the message.

Aspects described herein are directed to, for example, a system and method comprising receiving, by a client device, an input of at least a portion of a message. The at least the portion of the message may be displayed on a display of the client device. The client device may transmit, to a server device, the at least the portion of the message for display via a second client device. The server device may receive, from the client device, the at least the portion of the message for display via the second client device. The server device may transmit, to the second client device, the at least the portion of the message for display via the second client device.

In some aspects, the system and method may comprise receiving, from a user of the client device or a user of the second client device, a request to generate a marker for the at least the portion of the message. Receiving the request to generate the marker for the at least the portion of the message may comprise receiving, via one or more input device of the client device, an input of one or more shortcut keys indicative of the request to generate the marker for the at least the portion of the message. Additionally or alternatively, receiving the request to generate the marker for the at least the portion of the message may comprise receiving, via one or more input device of the client device, an input of the name for the marker for the at least the portion of the message.

In response to the receiving the request to generate the marker, the client device may determine, based on a lexicon, a name for the marker for the at least the portion of the message. Determining the name for the marker for the at least the portion of the message may comprise parsing, by the client device, text of the at least the portion of the message to generate a plurality of words or phrases and/or selecting, by the client device and from the plurality of words or phrases, a word or phrase to use as the name for the marker. Selecting the word or phrase to use as the name for the marker may be based on a comparison of the plurality of words or phrases with words or phrases in the lexicon.

The client device may store, at a storage location, the name for the marker for the at least the portion of the message, an identifier for the at least the portion of the message, and/or an association between the name for the marker for the at least the portion of the message and the identifier for the at least the portion of the message. In some aspects, the method may comprise transmitting, by the client device, a request to add the name for the marker (e.g., implicit or explicit) to the lexicon.

In some aspects, the system and method may comprise receiving, from a user of the client device, a request to display the at least the portion of the message. The request may comprise an indication of the name for the marker. The client device may determine, based on the indication of the name for the marker, and based on the association between the name for the marker for the at least the portion of the message and the identifier for the at least the portion of the message, the identifier for the at least the portion of the message. The method may comprise displaying, on the display of the client device and based on the identifier for the at least the portion of the message, the at least the portion of the message.

In some aspects, the system and method may comprise storing, by the client device and at a database, the at least the portion of the message. During a messaging session between the user of the client device and a user of a third client device, the method may comprise receiving, from the user of the client device or the user of the third client device, a request to display the at least the portion of the message. The request to display may comprise an indication of the name for the marker. The client device may determine, based on the indication of the name for the marker, and based on the association between the name for the marker for the at least the portion of the message and the identifier for the at least the portion of the message, the identifier for the at least the portion of the message. The client device may retrieve, from the database, and based on the identifier for the at least the portion of the message, the at least the portion of the message. The method may comprise displaying, on the display of the client device, the retrieved at least the portion of the message.

In some aspects, the method may comprise determining, by the client device, a topic associated with at least a portion of the messaging session between the user of the client device and a user of a third client device during a messaging session between the user of the client device and the user of the third client device. The client device may determine that the topic corresponds to the marker for the at least the portion of the message. In response to determining that the topic corresponds to the marker for the at least the portion of the message, the client device may retrieve, from a database, and based on the identifier for the at least the portion of the message, the at least the portion of the message. The method may comprise displaying, on the display of the client device, the retrieved at least the portion of the message.

BRIEF DESCRIPTION OF THE DRAWINGS

The present disclosure is illustrated by way of example and not limited in the accompanying figures in which like reference numerals indicate similar elements and in which:

FIG. 11 illustrates an example message flow marker index in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
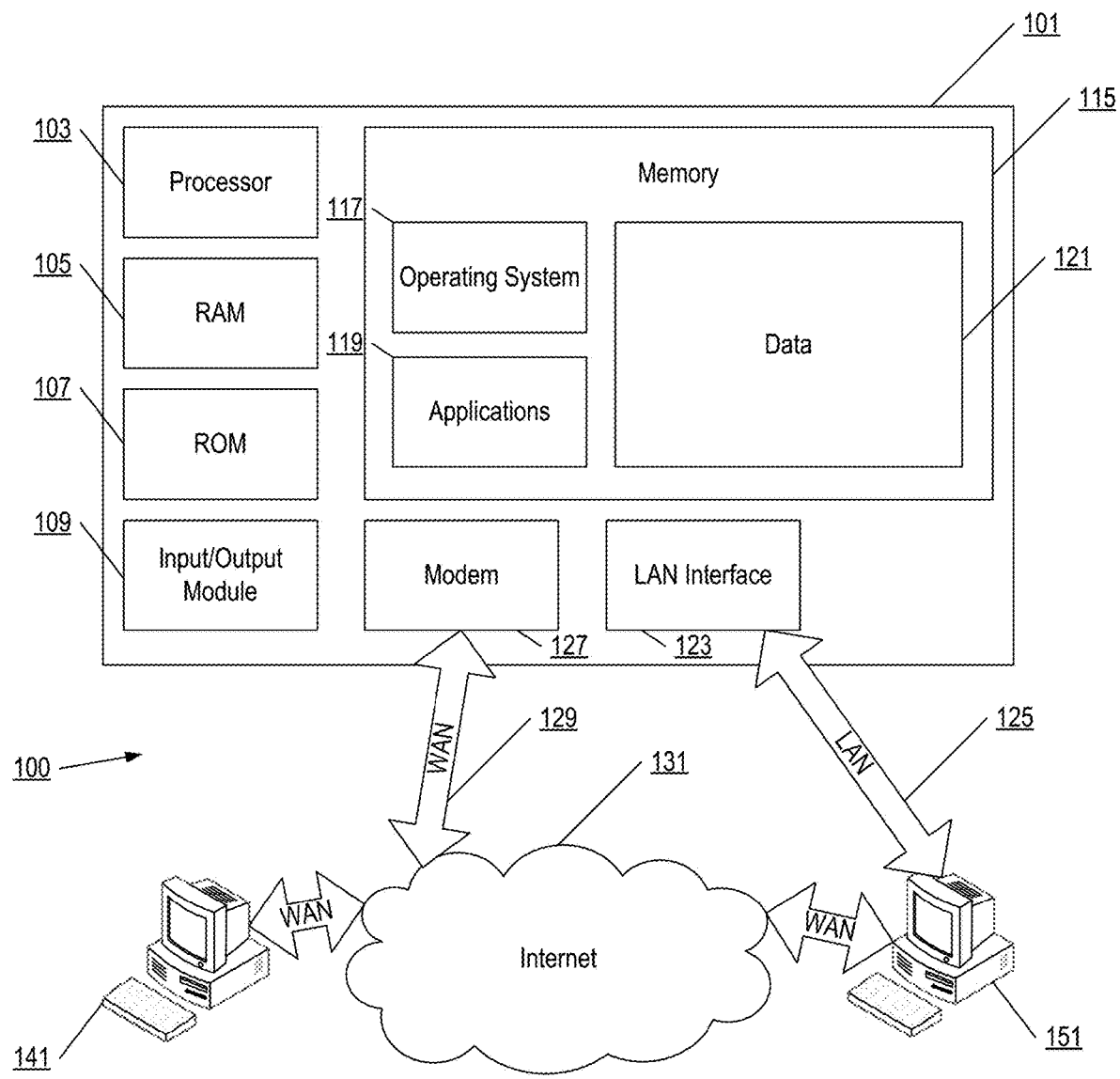
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other mobile devices, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

Figure 2:
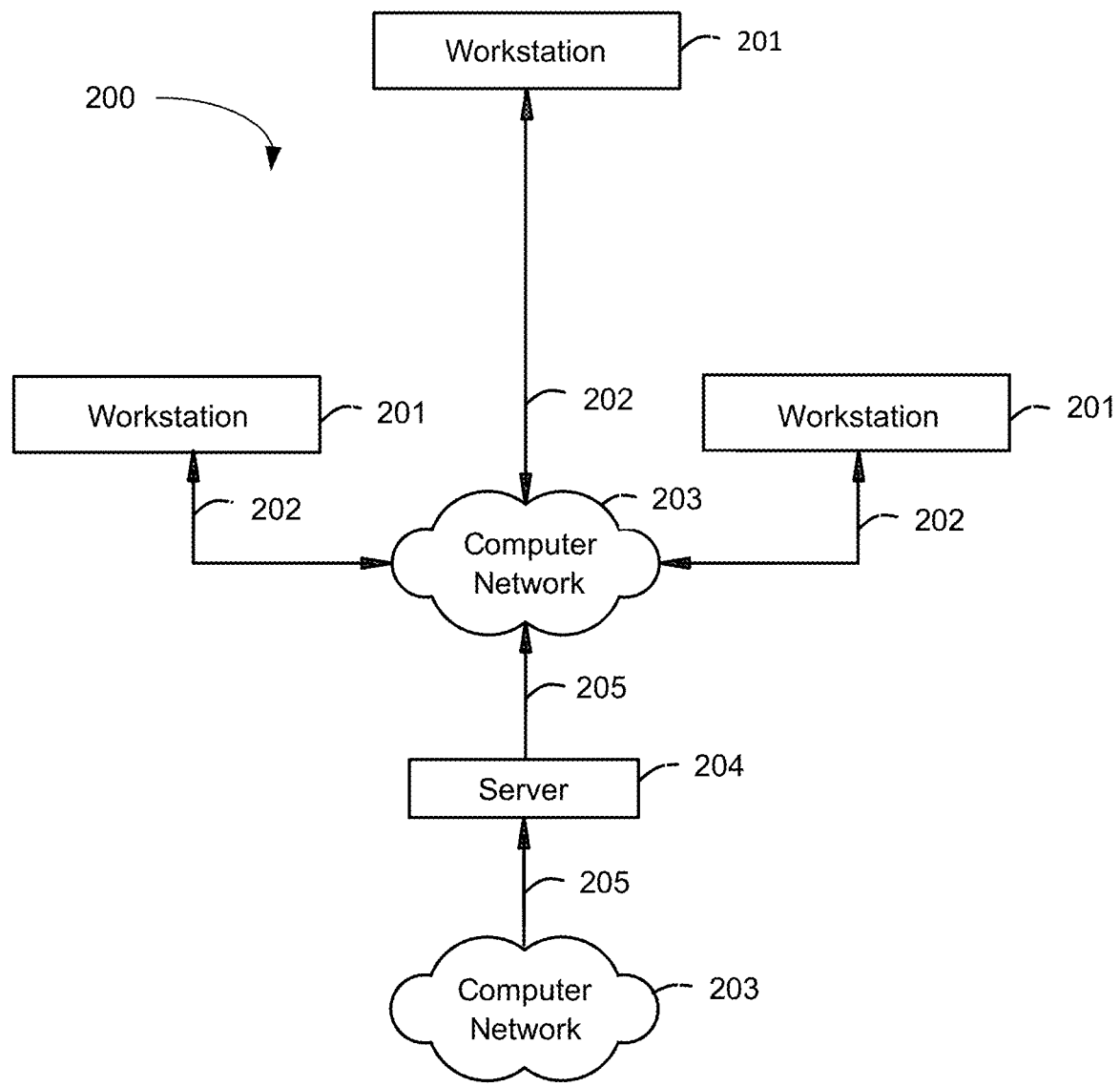
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
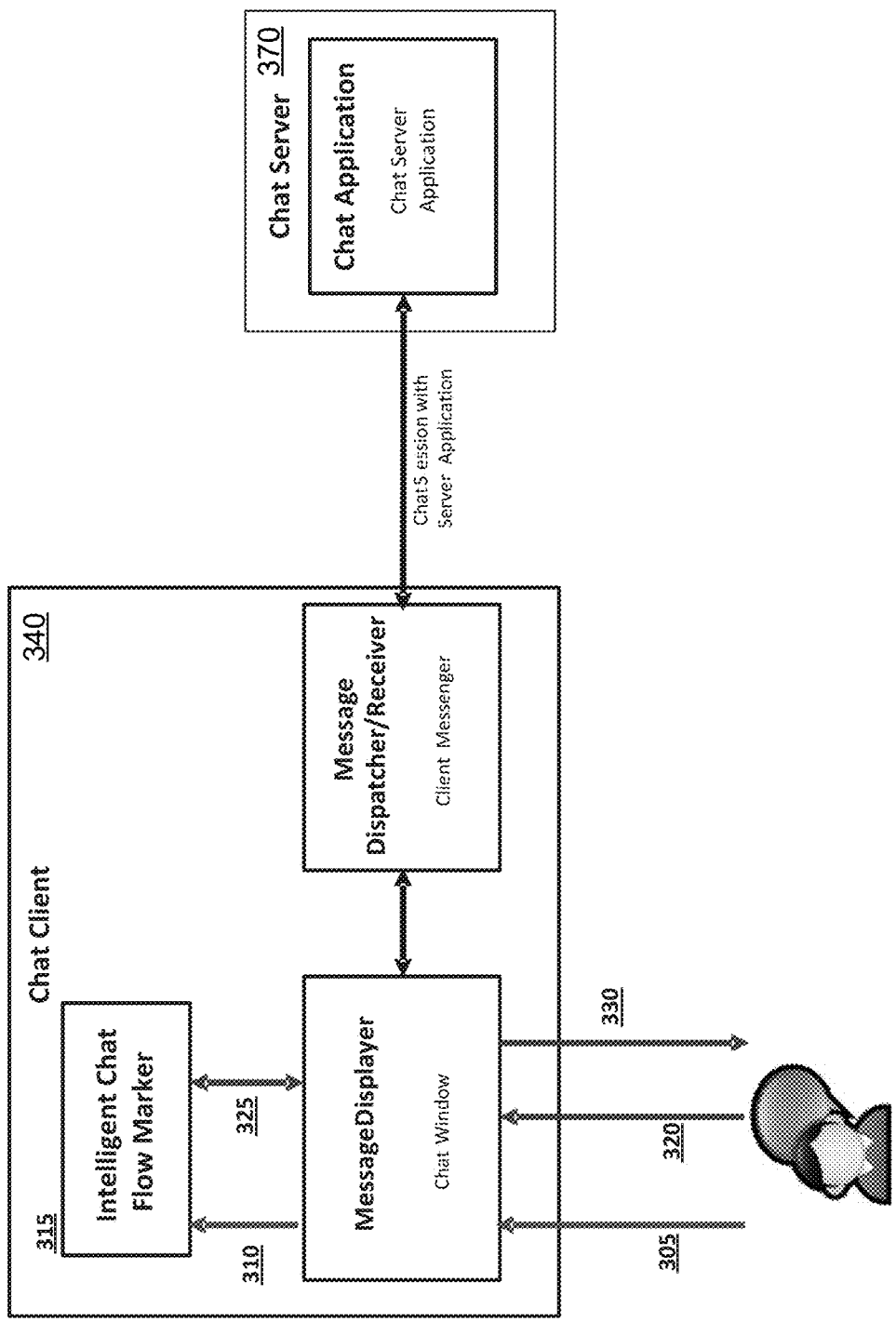
FIG. 3 illustrates an example method and processing system using intelligent messaging flow markers based on language data in which various aspects of the disclosure may be implemented.

FIG. 3 illustrates an example method and processing system using intelligent messaging flow markers based on language data in which various aspects of the disclosure may be implemented. Users (e.g., an agent and a customer) may message each other using a corresponding chat client device 340 for each user and a chat server 370. In some aspects, the client device 340 may comprise one or more of the components of the computing device 101 illustrated in FIG. 1. The chat server 370 may also comprise one or more of the components of the computing device 101 illustrated in FIG. 1. A corresponding message displayer of the chat client 340 may display, via a chat window, the messages inputted (e.g., typed) by each user. During the messaging (e.g., chat conversation) between the two users, one of the users may desire to add a marker (e.g., an explicit marker) to the conversation in order to reference a portion of the conversation in the future. For example, in step 305, a user (e.g., an agent) may input a request to mark one or more lines of the chat flow with a marker (e.g., a tag identifier). The user may mark the line with a marker tag identifier name (e.g., explicit marker), such as with the help of shortcut keys. The user may mark multiple lines with appropriate tag identifiers. The message displayer may receive the request. In step 310, the message displayer may forward the request to an intelligent chat flow marker of the chat client 340. In some aspects, implicit markers may be added to the conversation without, for example, a user request to create the markers. As will be described in further detail below, the intelligent chat flow marker may intelligently identify a topic for a given chat pair and save the topic to an index for future reference. The index may comprise a plurality of implicit and explicit markers.

In step 315, the intelligent chat flow marker may generate an implicit marker or an explicit marker for the corresponding line(s) in the chat flow. The intelligent chat flow marker may also maintain (e.g., store and manage) a sorted index that associates chat line identifiers with marker tag information for message sessions. The intelligent chat flow marker may intelligently identify the topics (e.g., products or services) and mark the respective line numbers in the message flow for easy display or scroll for future reference. In some aspects, the intelligent chat flow marker may intelligently cluster topics to generate one or more markers for a portion of a chat conversation, as will be described in further detail below.

In step 320, one of the users may desire to access (e.g., display and/or retrieve) a portion of the conversation for a specified marker with the tag identifier. For example, a user may go back to the previously-marked lines (e.g., with an explicit tag name or to an implicit marked line) with the help of shortcut keys. The message displayer may receive a request from the user and forward the request to the intelligent chat flow marker. In step 325, the intelligent chat flow marker may retrieve the line number for the requested tag identifier (or the next identifier) and send the corresponding text to the message displayer of the chat client device 340. The intelligent chat flow marker may retrieve the respective chat segment for the current conversation or retrieve, from a saved chat database, the respective chat segment for a previous conversation session. In step 330, the message displayer may display, to the user and via a display of the chat client device 340, the requested lines associated with the line number marked with the tag identifier.

A chat conversation or flow described herein may be explicitly or implicitly marked (e.g., tagged) with appropriate identifier names or topics, depending on the context of the chat conversation. The marked portions of the chat conversation may be scrolled to automatically whenever desired. This results in a more efficient chat client/server that is able to quickly look back to appropriate sections of previous chat conversations with speed and efficiency. Additionally or alternatively, the marking of the chat conversation may be made in a voice conversation (e.g., through speech to text and vice versa) through an appropriate (e.g., online interface). Internally, the speech may be converted to text and marking may occur as an automatic natural language programming (NLP) based marking of the message flow intelligently and/or through explicit marking. Additional advantages and details of the method and processing system using intelligent messaging flow markers will be described in further detail below.

Figure 4:
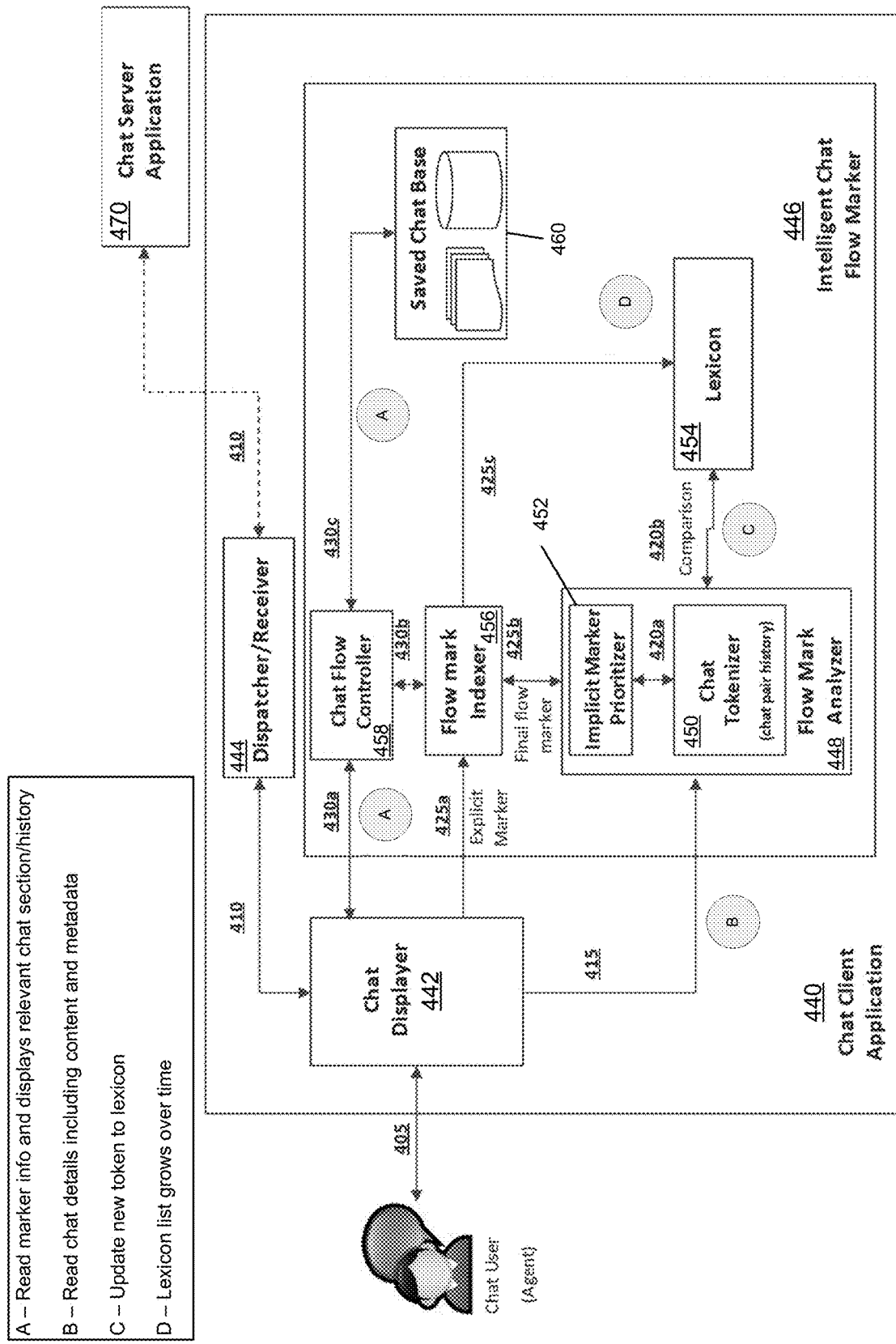
FIG. 4 illustrates another example method and processing system using intelligent messaging flow markers based on language data in which various aspects of the disclosure may be implemented.

FIG. 4 illustrates another example method and processing system using intelligent messaging flow markers based on language data in which various aspects of the disclosure may be implemented. A first chat client user (e.g., an agent) may interact with a second chat client user (e.g., a customer) via a chat client and/or chat server and their associated computing devices. In some aspects, the processing system described herein may comprise a chat client device and/or an application 440 installed or running on the chat client device. The processing system described herein may also comprise a chat application server 470. The chat client device/application 440 and the chat application server 470 may facilitate one or more messaging (e.g., chat) sessions between the first user and the second user (or other users).

In step 405, a chat displayer 442 of the chat client application 440 may receive one or more chat communications from a respective user (e.g., a chat agent). The chat displayer 442 may display, on a display of the chat client device associated with the chat agent, the one or more chat communications received from the chat agent. With brief reference to FIG. 5, the chat agent may input, via an input device of the client device, a message such as "Hi Allyson, Good morning!, how can I help you?" (e.g., as illustrated in line 1 of the chat browser window).

Returning to FIG. 4, in step 410, the chat displayer 442 may use the dispatcher/receiver 444 of the chat client application 440 and/or the chat server 470 to send the one or more chat communications and/or related metadata to a chat client device of a chat counterparty (e.g., a user being assisted by a chat agent). A chat displayer of the chat counterparty may display, on a display of the client device associated with the customer, the chat communications received from the chat agent. The chat counterparty using the chat client device may similarly send chat communications and/or related metadata to the chat client device of the chat agent. The chat communications received from the first user and the second user may be displayed on a chat window.

The chat client application 440 may comprise an intelligent chat flow marker 446, which may automatically monitor and analyze the chat session between the first and second users. In some aspects, the chat flow marker 446 may comprise a plugin and/or a feature-based component that may be built on an application programming interface (API), such as a Java API, to mark the chat conversation flow.

In step 415, a flow mark analyzer 448 of the intelligent chat flow marker 446 may receive, read, and analyze the chat communications between the first user and the second user. The flow mark analyzer 448 may also receive, read, and analyze metadata associated with the chat communications (e.g., sent via the chat session). Metadata associated with the chat communications may comprise, for example, an identifier (e.g., a line number) for each portion of the chat communication received from a user, a timestamp for each received chat communication, an identifier (e.g., number) for the overall chat session, and the like.

In step 420a, a chat tokenizer 450 of the flow mark analyzer 448 may tokenize chat text.

For example, the chat tokenizer 450 may break text conversation(s) into one or more words and/or phrases. The chat tokenizer 450 may compare the tokenized chat text (e.g., words and/or phrases) with a lexicon 454 (e.g., a business lexicon) stored in a database. The lexicon 454 may comprise a plurality of predefined topics, such as words or phrases, that may be used to mark chat conversations. If the chat tokenizer 450 detects a match between the token and one or more topics in the lexicon (e.g., identifies a co-occurrence), the flow mark analyzer 448 may mark the line number associated with the chat text with the one or more topics. For example, the flow mark analyzer 448 may generate an implicit marker for the associated chat text and/or its line number. In some aspects, the lexicon 454 may comprise a plurality of lexicons. For example, each business unit of an organization may have a different lexicon.

Figure 6:
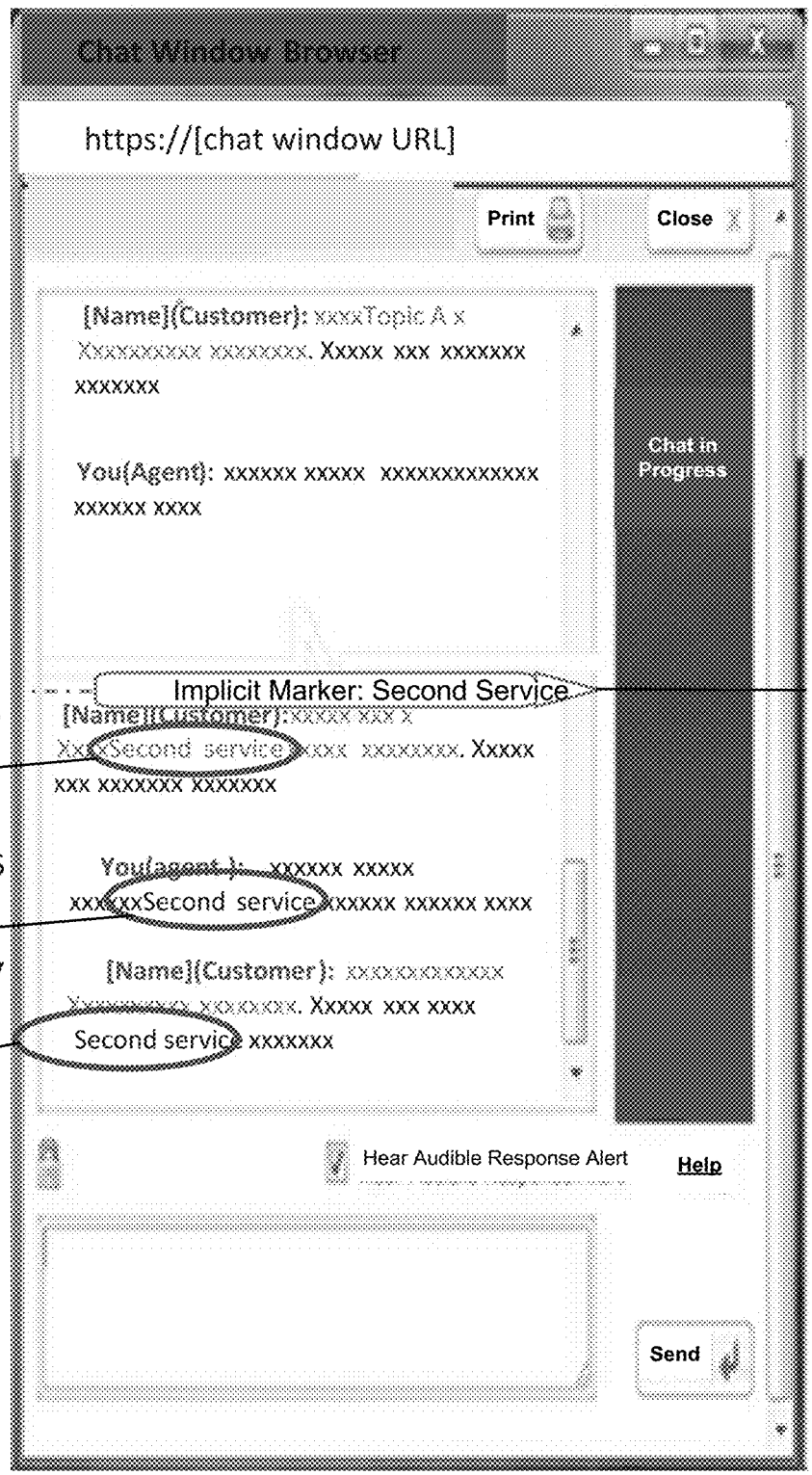
FIG. 6 illustrates an example user interface using intelligent messaging flow markers in which various aspects of the disclosure may be implemented.

In some aspects, an implicit marker prioritizer 452 of the flow mark analyzer 448 may process and determine which line in the message flow to mark, such as if the phrase or word appears a plurality of times in the chat flow. FIG. 6 illustrates an example user interface 600 using intelligent messaging flow markers in which various aspects of the disclosure may be implemented. The implicit marker prioritizer 452 may detect three instances of the phrase "Second service," such as the instance 605 in line 285, the instance 610 in line 286, and the instance 615 in line 287. In some aspects, the prioritizer 452 may mark 620 the first occurrence (e.g., in line 285) in a grouping of chat lines (e.g., lines 285-287) that contain the relevant topic (e.g., the topic "Second service"). The prioritizer 452 may alternatively mark other occurrences of the topic, such as the last occurrence (e.g., line 287) or another occurrence, rather than the first occurrence.

In some aspects, the prioritizer may group chat lines based on the distance of the relevant word or phrase to the next closest instance of the same word or phrase. The prioritizer 452 may group chat lines comprising the relevant phrase together if the next closest line of each of the lines is within a threshold number of lines (e.g., two lines) of each other. For example, assume that the threshold number of lines is two lines. If a first chat line comprising the relevant phrase is line 5, and a second chat line comprising the relevant phrase is line 7, the prioritizer 452 may group chat lines 5 and 7 together with the relevant phrase. If another chat line comprising the relevant phrase is line 18, the prioritizer 452 might not group chat line 18 with the other chat lines. On the other hand, if line 8 comprises the relevant phrase, the prioritizer 452 may group line 8 with lines 5 and 7.

In some aspects, the words and/or phrases extracted from the chat tokenizer 450 might not be available in the lexicon 454. If the words and/or phrases are not available in the lexicon, the chat tokenizer 450 may process and determine the similarity between the words and/or phrases in the chat conversation (and absent from the lexicon 454) and one or more topics already in the lexicon 454 (e.g., via natural language programming (NPL) algorithms). Once the flow mark analyzer 448 finds a match, it may group the two topics together and/or suggest the topic already in the lexicon for the words and/or phrases absent from the lexicon 454 (and its associated chat line(s)). If the words and/or phrases absent from the lexicon 454 are not in the lexicon 454 and/or not related to a topic already in the lexicon 454, the flow mark analyzer 448 may add the words and/or phrases absent from the lexicon 454 to the lexicon 454. In these examples, the words and/or phrases absent from the lexicon 454 may also be suggested as the topic. For example, an initial lexicon may exist, and the system described herein may identify and add new words and/or phrases to the lexicon. The new words and/or phrases may be intelligently identified from the message through NLP algorithms. These new words and/or phrases may be used as an implicit marker for that portion (and future portions) of message(s).

In some aspects, if a token (e.g., phrase or word) repeats often for a set of chat texts for a given chat pair (e.g., greater than a threshold number of occurrences or a threshold number of occurrences during a particular time frame), the flow mark analyzer 448 may determine that the token is a topic (e.g., a place, specific/set of things, objects, and the like). If the token is not currently found in the lexicon list 454, the flow mark analyzer 448 may update the lexicon 454 with the repeating token (and/or its related tokens) to use as future markers. The flow mark analyzer 448 may also generate an implicit marker comprising the line number or line numbers having the repeating token(s). In some aspects, the learning of tokens to be marked (e.g., with implicit markers) may be executed through a machine learning algorithm, such as random forest clustering techniques. For example, new words or phrases may be identified intelligently from the message through NLP algorithms, and the new word or phrase may act as implicit marker for that and future portions of message(s). The generated flow marker tokens may be sorted. As previously explained, the first flow marker for the given related token and chat pair may be identified.

Figure 5:
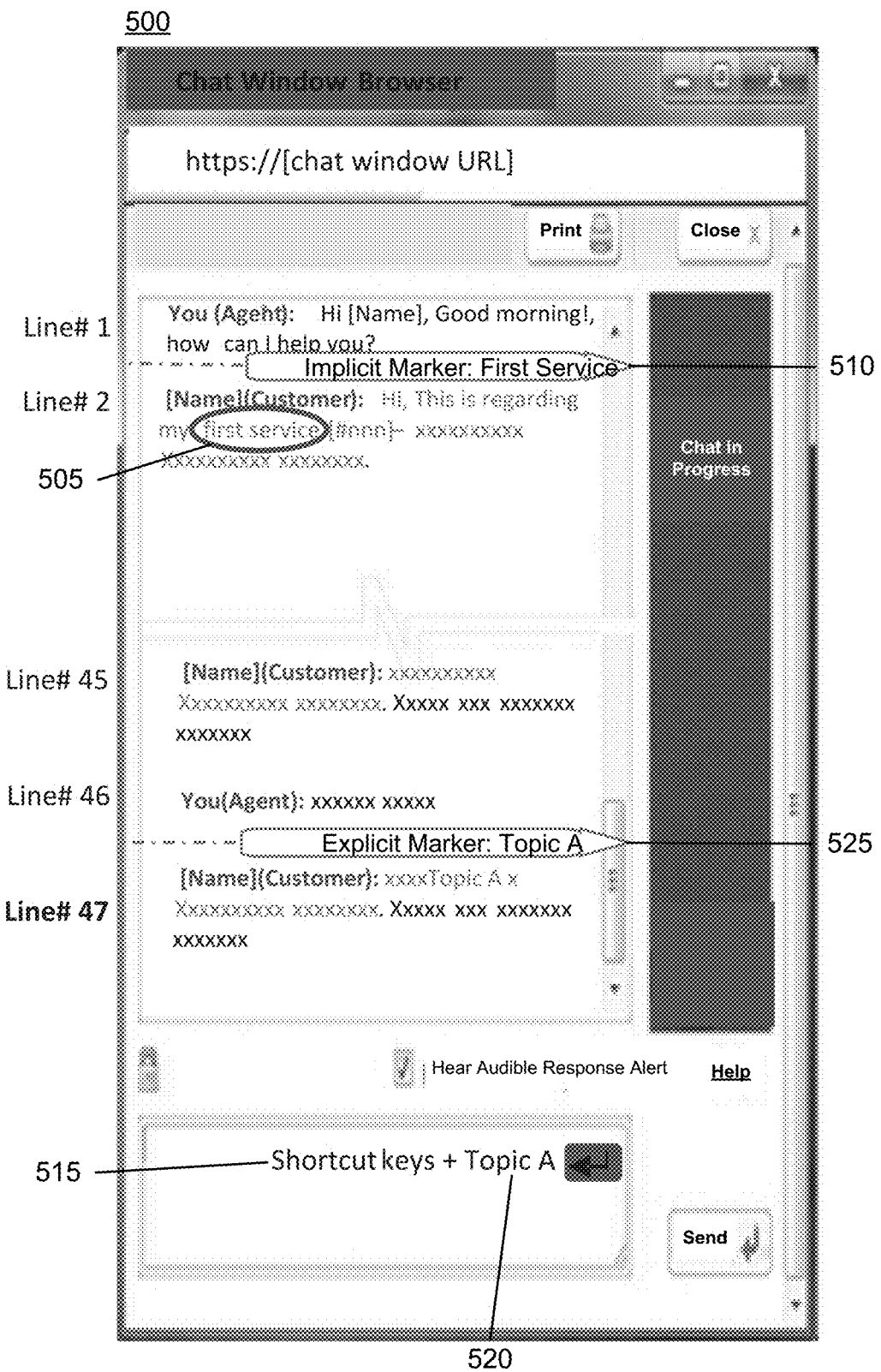
FIG. 5 illustrates an example user interface using intelligent messaging flow markers in which various aspects of the disclosure may be implemented.

FIG. 5 illustrates an example user interface 500 using intelligent messaging flow markers in which various aspects of the disclosure may be implemented. As previously explained, chat communications received from a first user (e.g., a chat agent) and a second user (e.g., a customer) may be displayed on a chat window 500 via a chat displayer 442. During the conversation, the flow mark analyzer 448 may read and analyze the chat communications between the first user and the second user (e.g., in step 415). The flow mark analyzer 448 may detect a match between chat text (and/or an associated token) and one or more topics in a lexicon 454. For example, the flow mark analyzer 448 may detect the phrase "first service" 505 in the message flow and determine that the phrase "first service" is also in the lexicon 454 (e.g., in step 420b). In response to determining that the detected phrase "first service" 505 is in the lexicon 454, the flow mark analyzer 448 may generate an implicit marker 510 for the associated chat text (e.g., the entire chat text from the second user, such as "Hi, This is regarding my first service . . . _____" or a portion of the chat text, such as "first service" or "first service #1234") and/or its line marker (e.g., line 2). The implicit marker 510 may be stored, such as in an index, for future use.

Returning to FIG. 4, a flow mark indexer 456 may store and maintain an index with identified implicit markers (and/or explicit markers), line information (e.g., from the flow mark analyzer 448), and/or other metadata. Lines may be intelligently marked with implicit markers so that a user may refer back to a particular line by, for example, a shortcut key or keys for future quick reference. In step 425b, the flow mark indexer 456 may receive the implicit flow marker (and associated metadata, such as line number) from the flow mark analyzer 448. The flow mark indexer 456 may store the implicit flow marker and associated metadata in the index.

The system described herein may comprise a flow mark indexer 456 that stores and/or maintains an index comprising information for implicit and explicit markers. During a chat conversation, a user (e.g., chat agent or a customer) may desire to mark a chat flow line with an explicit marker. That is, during a messaging session between two users, the chat displayer 442 may receive a request from one of the users to generate an explicit chat flow marker (e.g., manually added markers). The chat agent or the customer may explicitly mark the chat flow using short cut keys, pressing a virtual button on the chat window browser, or via any other method of indicating a desire to create marker. In some aspects, selection of the shortcut keys may depend on the chat application. In step 425a, the flow mark indexer 456 may receive the indication to mark the chat flow, along with metadata such as the line number and/or the topic for the explicit marker. In some aspects, the flow mark indexer 456 may determine the line number and/or topic for the explicit marker. The flow mark indexer 456 may index the marker and the chat line, such as in plaintext, as previously described.

In some aspects, the explicit marker might not be in the lexicon 454. In step 425c, the flow mark indexer 456 may send a request to the lexicon 454 to add the topic for the explicit marker to the lexicon 454 for future utilization and/or comparison. A token for the explicit marker may be added to the lexicon 454 responsive to the request.

With reference to FIG. 5, a user, during a chat conversation, may input one or more shortcut keys 515 to indicate a desire to add an explicit marker to the chat conversation. In some aspects, the user may input a name 520 for the explicit marker (e.g., "Topic A") after pressing the shortcut keys 515. Inputting the one or more shortcut keys and/or the name for the explicit marker may send a request to the flow mark indexer 456 comprising the request to create an explicit marker and metadata related thereto, such as the line number (e.g., line 47), the name for the explicit marker (e.g., "Topic A"), and the like. As previously described, the flow mark indexer 456 may create the explicit marker (e.g., marker 525), index the marker, and/or add the marker topic to the lexicon 454 responsive to the request from the user. By explicitly marking the chat flow at line 47 with a name, users may refer back to this line by, for example, a simple shortcut key(s) for quick future reference.

In some aspects, the system may provide one or more suggestions to the user for naming the explicit marker. The user may input the shortcut key(s) to create (or otherwise request creation of) an explicit marker, and the chat flow marker 446 may generate one or more suggestions for naming the marker. The chat flow marker 446 may parse the text of the chat conversation and generate suggestions based on the parsed text of the associated line of chat text. For example, the flow mark indexer 456 may suggest the name "Topic A" for line 47 because the text "Topic A" appears in line 47. Moreover, the flow mark indexer 456 may compare the text of the associated line (e.g., line 47) with the topics included in the lexicon 454. If the flow mark indexer 456 determines one or more similarities (e.g., matches), the flow mark indexer 456 may suggest the one or more similar topics from the lexicon 454. In some aspects, the flow mark indexer 456 may generate suggestions if the user did not input a name for the marker. The flow mark indexer 456 may cause display of the generated suggestion(s) via the chat displayer 442. If the user selects an option to use one of the suggested names, the flow mark indexer 456 may index the flow marker with the selected name and associated metadata, as previously discussed. If the user does not choose one of the suggested names, the flow mark indexer 456 may choose one of the names for the explicit marker, such as after a predetermined time. Accordingly, the intelligent chat flow marker 446 described herein may intelligently suggest marker or topic names (e.g., which may be identified using NLP algorithms) and display and/or create the markers based on the suggested name(s).

Figure 7:
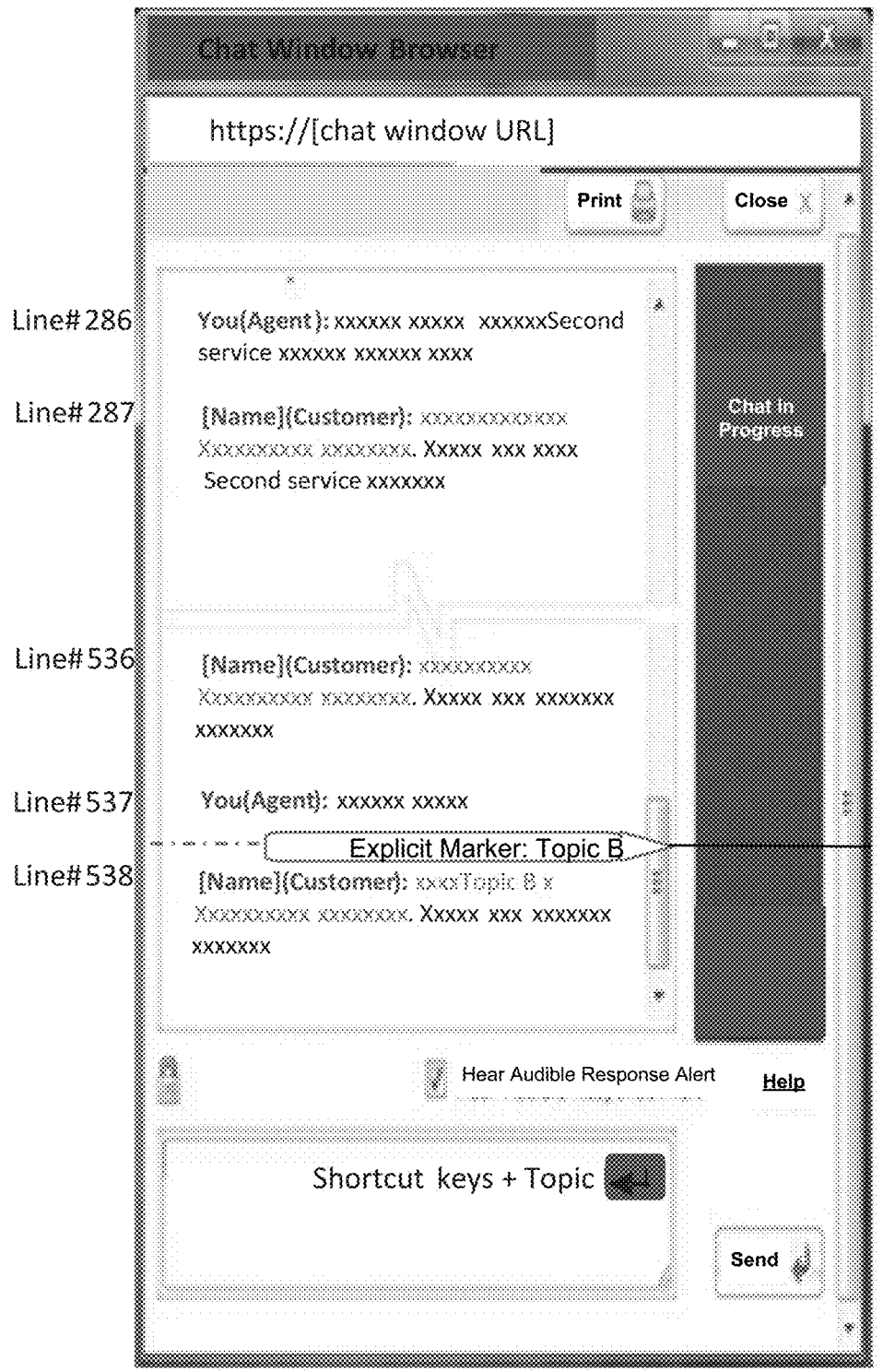
FIG. 7 illustrates an example user interface using intelligent messaging flow markers in which various aspects of the disclosure may be implemented.

FIG. 7 illustrates an example user interface 700 using intelligent messaging flow markers in which various aspects of the disclosure may be implemented. During the course of a conversation between two users, a plurality of explicit and/or implicit markers may be created. For example, one of the users may request creation of an explicit marker at line 538 (e.g., by selecting one or more shortcut keys and/or inputting a name for the marker). The intelligent chat flow marker 446 may receive the request and generate a marker 705 for line 538, such as Topic B. By explicitly marking the chat flow at line 538 with a name (e.g., "Topic B"), users may refer back to this line by, for example, inputting one or more shortcut keys for future quick reference.

As previously described, the flow mark indexer 456 may generate and store an index for implicit and explicit markers in a chat flow. FIG. 11 illustrates an example message flow marker index 1100 in which various aspects of the disclosure may be implemented. For example, the index 1100 may associate line 2 of the chat flow with the tag identifier "First Service." The index 1100 may associate line 47 with the tag identifier "topic A." The index 1100 may associate line 285 with the tag identifier "Second Service." The index 1100 may associate line 538 with the tag identifier "topic B." As more markers are generated for a particular chat flow, the flow mark indexer 456 may generate and store one or more corresponding entries in the index 1100.

Figure 8:
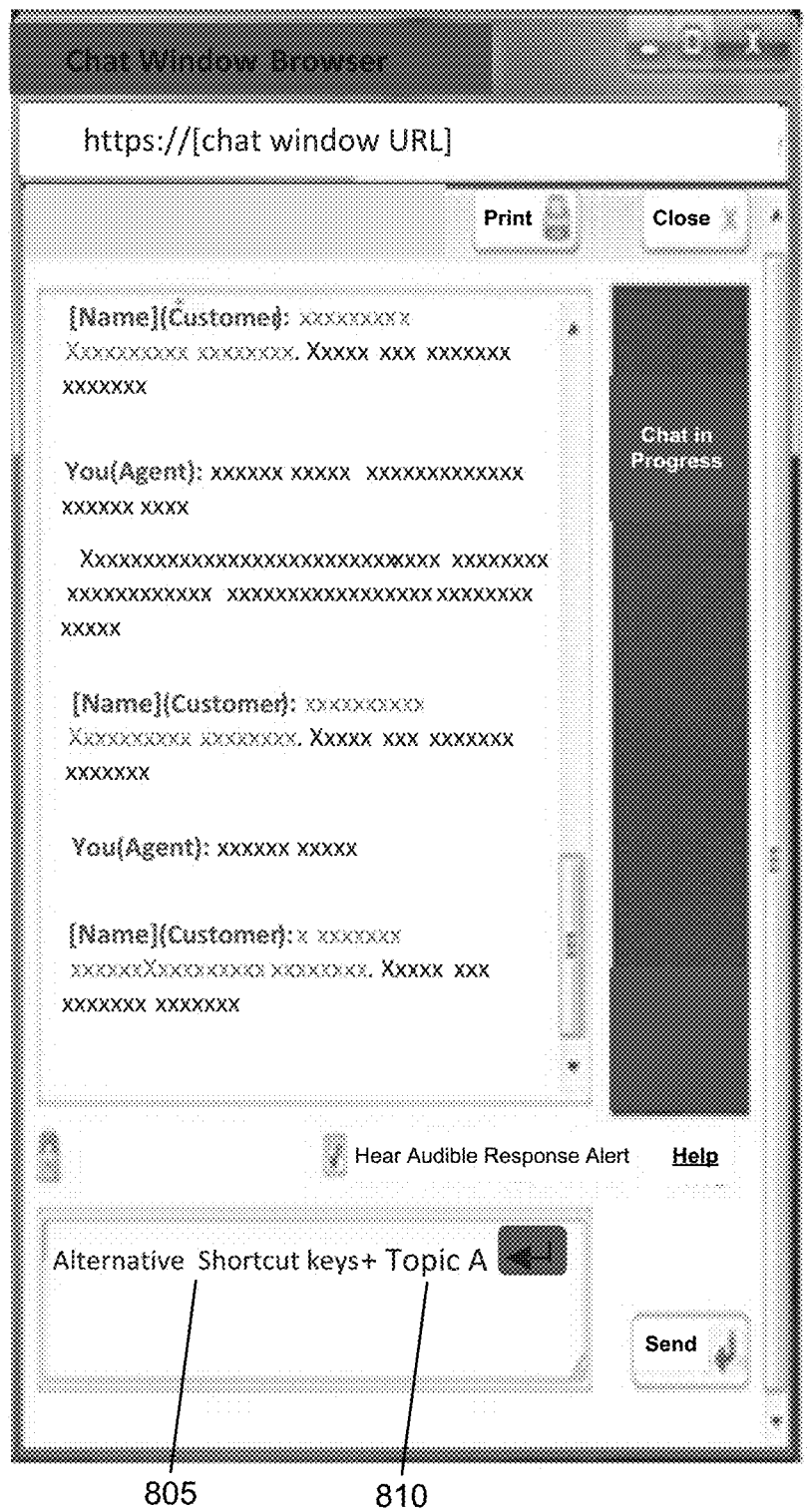
FIG. 8 illustrates an example user interface using intelligent messaging flow markers in which various aspects of the disclosure may be implemented.

The system described herein may use the markers to navigate to the relevant portions of a chat conversation. FIG. 8 illustrates an example user interface 800 using intelligent messaging flow markers in which various aspects of the disclosure may be implemented. One of the parties to the chat conversation (e.g., the agent or customer) may request to navigate to or display text associated with one of the markers previously generated. For example, the agent may desire to scroll to the explicit flow marker "Topic A." The agent may input (e.g., type) shortcut key(s) 805 and the name 810 of the desired marker (e.g., "Topic A"). The shortcut key(s) for navigating to text associated with a marker may be different from the shortcut key(s) used to create a marker.

Returning to FIG. 4, in step 430a, a chat flow controller 458 of the chat flow marker 446 may receive the user request, including the name of the marker. In step 430b, the chat flow controller 458 may compare or otherwise validate the received flow marker name with the marker index. For example, the chat flow controller 458 may access the index 1100 illustrated in FIG. 11 and determine that the requested marker "Topic A" is at line 47. The chat flow controller 458 may determine which line(s) to display based on the index.

Figure 9:
FIG. 9 illustrates an example user interface using intelligent messaging flow markers in which various aspects of the disclosure may be implemented.

If the user requesting to view line(s) associated with a marker is still in the same chat session, the chat flow controller 458 may navigate (e.g., scroll) up to the relevant chat session section (e.g., line 47). FIG. 9 illustrates an example user interface 900 using intelligent messaging flow markers in which various aspects of the disclosure may be implemented. The chat flow controller 458 may output for display, on the user device of the agent and/or user device of the customer, the relevant section (e.g., starting at line 47) via the chat displayer 442.

Figure 10:
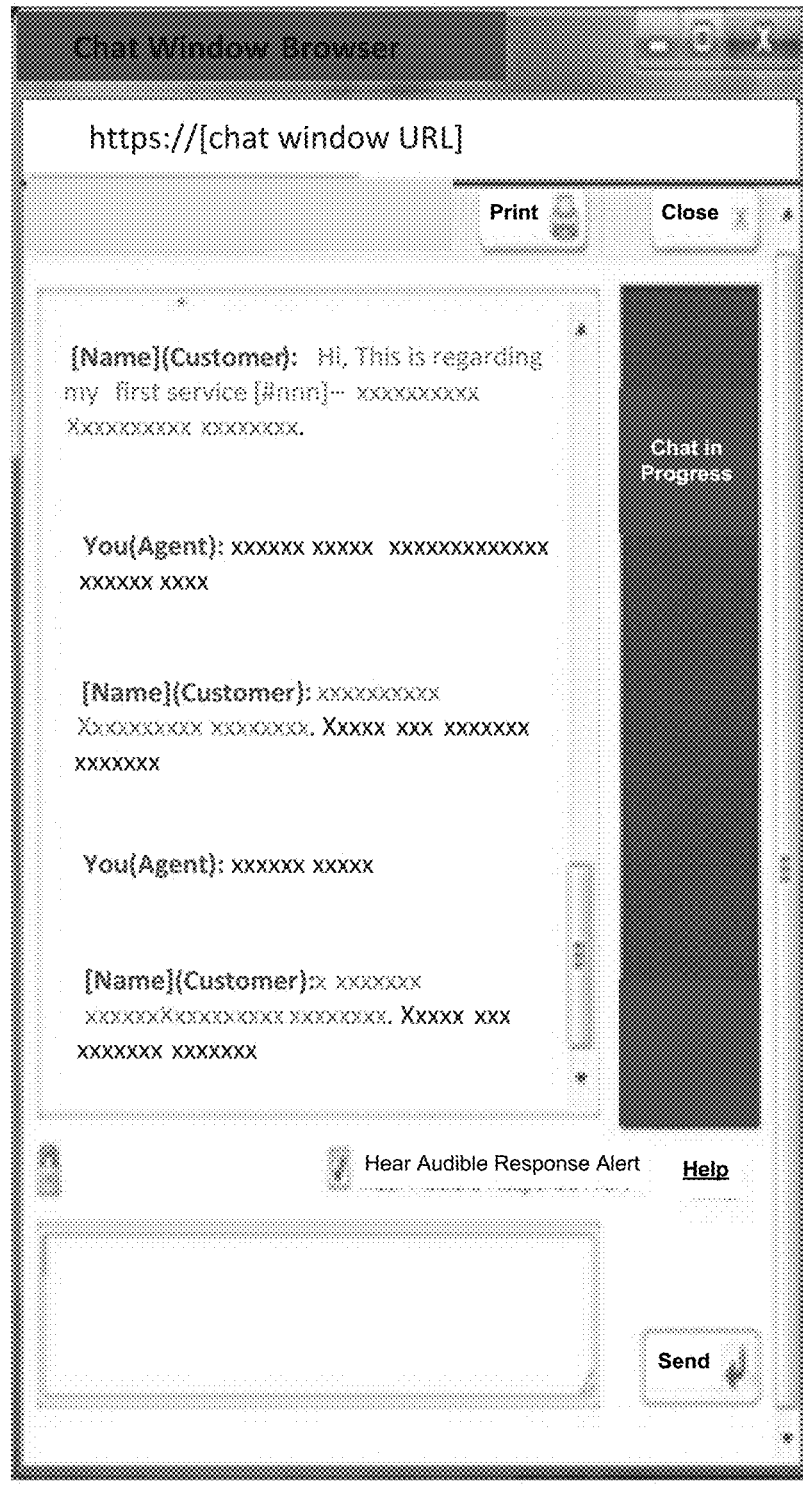
FIG. 10 illustrates an example user interface using intelligent messaging flow markers in which various aspects of the disclosure may be implemented.

In some aspects, the user may desire to scroll up or down to the next tagged portion of the chat conversation. For example, the user may input one or more shortcut keys 905 to scroll up to the immediately preceding tagged portion, which may be an implicit marker or an explicit marker. The user might not input the name for the marker used to mark the immediately preceding tagged portion. The chat flow controller 458 may receive the user request and output for display, on the user device of the agent and/or user device of the customer, the relevant section via the chat displayer 442. FIG. 10 illustrates an example user interface 1000 using intelligent messaging flow markers in which various aspects of the disclosure may be implemented. In response to the user inputting the shortcut keys in the user interface 900 illustrated in FIG. 9, the chat flow controller 458 output for display, on the user device of the agent and/or user device of the customer, the relevant section (e.g., starting at line 2) via the chat displayer 442. That is, the chat flow controller 458 may move to the immediately preceding marker, which as illustrated in FIG. 10, may be the text corresponding to the tag "first service" in line 2 (and stored in the index 1100).

Returning to FIG. 4, the chat flow controller 458 may store, in a saved chat database 460, portions of chat conversations for future retrieval. The chat flow controller 458 may store the portions of chat text based on (e.g., in association with) the flow marker(s) so that the portions of the chat text may be retrieved in the future using the name of the flow marker(s). For example, the chat flow controller 458 may store text for the line corresponding to the marker and/or may store text for one or more lines before or after the line corresponding to the marker. The chat flow controller 458 may also store the text corresponding to a grouping of chat lines, as previously described. In some aspects, the chat flow controller 458 might not store portions of chat conversations that do not have a corresponding marker (e.g., chat conversation lines between two conversation flow markers), thereby avoiding other unnecessary chat lines and saving memory storage space.

In some aspects, the marker requested by a user might not be in the current or same chat session. If the marker is not in the same chat session, the chat flow controller 458, in step 430c, may access the saved chat database 460 to retrieve the requested conversation text. The chat flow controller 458 may retrieve the conversation text based on (e.g., using) the marker name and/or line number. The chat flow controller 458 may fetch the relevant chat section from the saved chat database 460 and pass the section on through the chat displayer 442 for display on one or more user devices (e.g., the agent's user device).

In some aspects, a chat session may be a chat session between the agent and a different customer (e.g., customer B). During the chat session, the agent and different customer may chat about a topic previously covered by the agent, but with another customer (e.g., customer A). The chat flow controller 458 may determine the topic of interest based on, for example, at least a portion of the chat session text. The chat flow controller 458 may access the saved chat database 460 and determine, based on the data stored in the chat database 460, which customer or conversation has the greatest number of instances of a particular topic. The chat flow controller 458 may additionally or alternatively access the index (e.g., stored at the flow mark indexer 456) to determine which customer or conversation has the greatest number of instances of the relevant topic. For example, the chat flow controller 458 may count the number of instances of the topic in the index (and similarly for other indices associated with other conversations). The chat flow controller 458 may determine that a previous conversation between the agent and customer A has the greatest number of instances of a particular topic of interest between the agent and current customer B. The chat flow controller 458 may request, from the saved chat database 460, the relevant sections of saved messaging conversations with customer A. The relevant sections of saved messaging conversations may be displayed on a display of the agent's user device, as previously explained. Accordingly, the system described herein may intelligently link topics in one chat session with the same or similar topics in earlier or later chat sessions with the same user or other users.

In some aspects, the chat displayer 442 may comprise a speech to text option and/or functionality for searching for the markers. For example, a user may speak into a microphone of the user's client device. The client device may receive, via the microphone of the client device, the voice input of the at least the portion of the message. The chat displayer 442 may convert the voice input of the chat message (or a portion thereof) into a text version of the chat message (or portion thereof). The chat displayer 442 may send the text to the chat flow controller 458, and the chat flow controller 458 may mark the conversation through an interface (e.g., online interface). Internally, the speech may be converted to text, and then marking may occur. In some aspects, a spoken conversation between an agent and a customer may be converted to text (e.g., to create a transcript), and appropriate markers (e.g., implicit markers) may be added to the transcript of the text. In some aspects, text from speech transcripts may be made available to users through an online interface.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   receiving, by a first client device, a message input comprising a portion of a message session;
   displaying, by a first client device, the message input;
   sending, via a network by the first client device and to a server device, a portion of the message session for display via a second client device;
   receiving, from the client device or from a second client device, a request to generate a marker name associated with the portion of the message session;
   generating, by the first client device based on the request to generate a marker, a marker name for the portion of the message based on a match between the word or phrase in the portion of the message and one or more topics in a lexicon;
   identifying, by the first client device based on the lexicon, at least two occurrences of the marker name in the portion of the message, wherein the at least two occurrences of the marker name are on different lines of the plurality of lines;
   storing, at a first storage location, the marker name, an identifier for the portion of the message, and an association between the marker name and the identifier;
   grouping, for each occurrence of the marker name by the first client device, a predetermined number of lines of the portion of the message with a line identifier corresponding to the marker name, wherein the at least two occurrences of the marker name are on at least two lines of the predetermined number of lines;
   storing, by the first client device and at a second storage location, text associated with the grouping of the predetermined number of lines of the portion of the message;
   receiving, by the server device from the first client device, the portion of the message for display via the second client device;
   sending, by the server device to the second client device, the portion of the message via the network; and
   causing display, by the server device at the second client device, the portion of the message via a display of the second client device.

2. The method of claim 1, further comprising:
   receiving, via one or more input device of the first client device, an input of one or more shortcut keys indicative of the request to generate the marker for the at least the portion of the message.

3. The method of claim 1, comprising:
   receiving, via one or more input device of the first client device, an input of the marker name for the portion of the message.

4. The method of claim 1, further comprising:
   receiving, from the client device, a request to display the portion of the message, wherein the request comprises an indication of the marker name;
   determining, by the first client device, based on the indication of the marker name, and based on the association between the marker name for the portion of the message and the identifier for the portion of the message, the identifier for the portion of the message; and
   displaying, on a display of the first client device and based on the identifier for the portion of the message, the portion of the message.

5. The method of claim 1, further comprising:
   sending, by the client device, a request to add the marker name to a lexicon.

6. The method of claim 1, further comprising:
   parsing, by the client device, text of the portion of the message to generate a plurality of words or phrases; and selecting, by the first client device and from the plurality of words or phrases, a word or phrase to use as the marker name.

7. The method of claim 6, further comprising:
comparing the plurality of words or phrases with words or phrases in a lexicon.

8. The method of claim 1, further comprising:
during a messaging session between a user of the first client device and a user of a third client device, receiving, from the user of the first client device or the user of the third client device, a request to display the portion of the message, wherein the request to display comprises an indication of the marker name;
determining, by the first client device, based on the indication of the marker name, and based on the association between the marker name for the portion of the message and the identifier for the portion of the message, the identifier for the portion of the message;
retrieving, by the first client device from a database and based on the identifier for the portion of the message, text associated with the predetermined number of lines of the portion of the message; and
displaying, on the display of the first client device, the retrieved text associated with the predetermined number of lines of the portion of the message.

9. The method of claim 1, further comprising:
determining, during a messaging session between a user of the first client device and a user of a third client device and by the first client device, a topic associated with a portion of the messaging session between the user of the first client device and the user of the third client device;
determining, by the first client device, that the topic corresponds to the marker for the portion of the message;
based on determining that the topic corresponds to the marker for the portion of the message, retrieving, by the client device from a database and based on the identifier for portion of the message, the text associated with the predetermined number of lines of the portion of the message; and
displaying, on the display of the client device, retrieved text associated with the predetermined number of lines of the portion of the message.

10. A first client device comprising:
a display;
a processor; and
memory storing computer-executable instructions that, when executed by the processor of the client device, cause the first client device to:
receive an input of a portion of a message;
display, on the display, the portion of the message;
send, to a server device, the portion of the message for display via a second client device, wherein the portion of the message comprises a plurality of lines and occurrences of a word or phrase is on a different line of the plurality of lines;
receive, an input of the first client device or an input of a second client device, a request to generate a marker name for the portion of the message;
generate, based on the request, the marker name for the portion of the message based on a match between the word or phrase in the portion of the message and one or more topics in a lexicon;
store, at a storage location, the marker name, an identifier of the portion of the message and an association between the marker name and the identifier;
identify a line identifier associated with at least two occurrences of the marker name in the portion of the message, wherein the at least two occurrences of the marker name are on different lines of the plurality of lines;
group, for each occurrence of the marker name, a predetermined number of lines of the portion of the message with the line identifier corresponding to the marker name; and
store, at a storage location, text associated with the grouping of the predetermined number of lines of the at least the portion of the message.

11. The first client device of claim 10, wherein the instructions, when executed by the processor, cause the first client device to:
receive, via one or more input device of the first client device, an input of one or more shortcut keys indicative of the request to generate the marker for the at least the portion of the message.

12. The first client device of claim 10, wherein the instructions, when executed by the processor, cause the first client device to:
receive, via one or more input device of the first client device, an input of the marker name for the portion of the message.

13. The first client device of claim 10, wherein the instructions, when executed by the processor, cause the first client device to:
send, to the server, a request to display the portion of the message, wherein the request comprises an indication of the marker name;
determine, based on the indication of the marker name and based on the association between the marker name for the portion of the message and the identifier for the portion of the message, the identifier for the portion of the message; and
display, on a display of the first client device and based on the identifier for the portion of the message, the portion of the message.

14. The first client device of claim 10, wherein the instructions, when executed by the processor, cause the first client device to:
send, to the server, a request to add the marker name to a lexicon.

15. The first client device of claim 10, wherein the instructions, when executed by the processor, cause the first client device to:
parse text of the portion of the message to generate a plurality of words or phrases; and
select, from the plurality of words or phrases, a word or phrase to use as the marker name.

16. The first client device of claim 15, wherein the instructions, when executed by the processor, cause the first client device to:
compare the plurality of words or phrases with words or phrases in a lexicon.

17. The first client device of claim 10, wherein the instructions, when executed by the processor, cause the first client device to:
receive, during a messaging session between a user of the first client device and a user of a third client device and from a user of the first client device or the user of the third client device, a request to display the portion of the message, wherein the request to display the portion of the message comprises an indication of the marker name;

determine, based on the indication of the marker name and based on the association between the marker name for the portion of the message and the identifier for the portion of the message, the identifier for the portion of the message;

retrieve, from a database and based on the identifier for the portion of the message, text associated with the predetermined number of lines of the portion of the message; and display, on the display of the first client device, the retrieved text associated with the predetermined number of lines of the portion of the message.

18. The first client device of claim 10, wherein the instructions, when executed by the processor, cause the first client device to:

determine, during a messaging session between a user of the first client device and a user of a third client device, a topic associated with a portion of the messaging session between the user of the first client device and the user of the third client device;

determine, that the topic corresponds to the marker for the portion of the message;

retrieve, based on determining that the topic corresponds to the marker for the portion of the message and from a database based on the identifier for portion of the message, the text associated with the predetermined number of lines of the portion of the message; and display, on the display of the client device, the retrieved text associated with the predetermined number of lines of the portion of the message.

19. A system comprising:

a first client device, comprising:

a display;

a first processor; and first memory storing computer-executable instructions that, when executed by the first processor of the client device, cause the first client device to:

receive an input of a portion of a message;

send, to a server device, the portion of a message for display via a second client device, wherein the portion of the message comprises a plurality of lines and occurrences of a word or phrase is on a different line of the plurality of lines;

receive, via an input device of the client device or an input device of the second client device, a request to generate a marker name for the portion of the message;

generate, based on the request to generate the marker name, the marker name for the portion of the message based on a match between the word or phrase in the portion of the message and one or more topics in a lexicon, wherein the portion of the message comprises a plurality of occurrences of the marker name and wherein at least two occurrences of the marker name are on a different line of the plurality of lines;

store, at a storage location, the marker name, an identifier of the portion of the message, and an association between the marker name and the identifier;

group a predetermined number of lines of the portion of the message with a line identifier corresponding to the marker name, wherein an occurrence of the marker name is on at least two lines of the predetermined number of lines; and store, at a storage location, text associated with the grouping of the predetermined number of lines of the at least the portion of the message; and the server device comprising:

a second processor; and second memory storing computer-executable instructions that, when executed by the second processor of the server device, cause the server device to:

receive, from the client device, the at least the portion of the message for display via the second client device; and send, to the second client device, the at least the portion of the message for display via the second client device.

20. The system of claim 19, wherein the instructions stored on the first memory, when executed by the first processor, further cause the first client device to:

send, to the server, a request to add the marker name to a lexicon.

* * * * *